(12) United States Patent
Manfredotti

(10) Patent No.: US 6,279,704 B1
(45) Date of Patent: Aug. 28, 2001

(54) DEVICE FOR REDUCING THE VIBRATION GENERATED ON THE STRUCTURE OF A ROTARY-WING AIRCRAFT

(75) Inventor: Thomas Pierre Louis Manfredotti, Aix en Provence (FR)

(73) Assignee: Eurocopter, Marignane Cedex (FR)

(*) Notice: Subject to any disclaimer, the term of this patent is extended or adjusted under 35 U.S.C. 154(b) by 0 days.

(21) Appl. No.: 09/407,718

(22) Filed: Sep. 28, 1999

(30) Foreign Application Priority Data

Oct. 12, 1998 (FR) .................................................. 98 12725

(51) Int. Cl.[7] ............................. B64C 27/00; F16F 15/04; F16F 15/03
(52) U.S. Cl. ............................................ 188/378; 267/136
(58) Field of Search ..................................... 188/378–380; 267/136, 140.15; 244/17.27, 17.11, 17.13; 248/550, 638, 559; 416/500, 145; 318/611, 460; 52/167.1, 167.2; 310/15, 51; 73/178 H; 701/3

(56) References Cited

U.S. PATENT DOCUMENTS

| | | | |
|---|---|---|---|
| 5,086,564 | * 2/1992 | Schalz | 188/378 |
| 5,456,341 | 10/1995 | Garnjost et al. | 188/378 |
| 5,814,963 | * 9/1998 | Girard et al. | 318/611 |
| 5,883,447 | 3/1999 | Clausin | 310/51 |

FOREIGN PATENT DOCUMENTS 394 180 A2    10/1990   (EP) .
2 730 288      8/1996   (FR) .

OTHER PUBLICATIONS

French Search Report dated Jun. 17, 1999, 3 pages.

* cited by examiner

Primary Examiner—Douglas C. Butler
(74) Attorney, Agent, or Firm—Marshall, O'Toole, Gerstein, Murray & Borun

(57) ABSTRACT

The present invention relates to a device for reducing vibration generated on the structure (2) of a rotary-wing aircraft, particularly a helicopter. According to the invention, the device (1A) comprises at least one flapping mass (3) connected to the structure (2), at least one controllable actuating device (5A) capable of causing the flapping mass (3) to flap, and a control unit (UC1) intended to control the actuating device (5A) in such a way that it causes the flapping mass (3) to flap at a frequency and at an amplitude which allows the vibrations to be reduced and minimized.

14 Claims, 2 Drawing Sheets

DEVICE FOR REDUCING THE VIBRATION GENERATED ON THE STRUCTURE OF A ROTARY-WING AIRCRAFT

BACKGROUND OF THE INVENTION

The present invention relates to a device for reducing the vibration generated on the structure of a rotary-wing aircraft, particularly a helicopter.

Although not exclusively, the present invention applies more particularly to reducing the vibration generated by the aerodynamic flow through the main rotor which provides the helicopter with lift and forward drive.

It is known that said main motor, as it turns, sucks in air situated above it and drives it downward, accelerating it, in such a way as to create a stream of moving air. The pressure and speed of the air vary thoughout this air stream. The flow of this air over the structure of the helicopter generates vibration which is particularly noticeable in the cockpit region.

The vibration thus generated is due mainly to the excitation by the aforementioned aerodynamic flow of the characteristic modes of the helicopter structure, and particularly the first lateral or vertical bending mode of the helicopter tail boom, and is generally known as tail shake in the aeronautical field. The vibrations due to the excitation of this bending mode generally have a frequency of a few hertz and are extremely troublesome.

The various vibrations generated on the structure of a helicopter exhibit numerous drawbacks, particularly:
  in terms of the comfort of the crew and of the passengers,
  in terms of the fatigue of the parts and equipment items, and
  in terms of the operation of the weapon systems when the helicopter is equipped therewith.

SUMMARY OF THE INVENTION

The object of the present invention is to remedy these drawbacks. The invention relates to a simple and low-cost device that makes it possible, simply and effectively, to reduce the vibrations generated on the structure of a rotary-wing aircraft, and particularly the vibrations generated by the aerodynamic flow through the main rotor which provides said aircraft with lift and forward drive.

To this end, according to the invention, said device is noteworthy in that it comprises:
  at least one flapping mass connected to said structure;
  at least one controllable actuating means capable of causing said flapping mass to flap; and
  a control unit intended to control said actuating means in such a way that it causes said flapping mass to flap at a frequency and at an amplitude that allow said vibrations to be reduced and minimized.

Thus, by virtue of the invention, said device is an active device, whose vibration-reduction action, generated by the flapping mass, can be adjusted and optimized, thus allowing said vibrations to be effectively reduced.

Furthermore:
  because of the low number of components, said device is simple, compact and inexpensive; and
  because of the absence of moving parts, the operating cost of this device is very low.

Furthermore, advantageously, said device additionally comprises:
  a flexible blade connecting said flapping mass to said structure, which, in particular, makes the flapping of the flapping mass easier; and/or
  a position sensor capable of measuring values which represent the position of said flapping mass, said values being transmitted to said control unit and used by the latter to determine, refine and/or control the commands for controlling said actuating means, which makes it possible to increase the effectiveness of said device.

Although said actuating means can be of various types, particularly mechanical or hydraulic, it is preferably formed in such a way as to exert an electromagnetic force to cause said flapping mass to flap, and comprises at least one electromagnet.

According to the invention, said damping means may be produced in various ways.

By way of alternative forms, it may, in particular, comprise:
  a single electromagnet which is secured to the structure and acts on the flexible blade fixed to the structure, near to the attachment region, which makes it possible to obtain a simplified embodiment; a static load is constantly applied, and the dynamic load is applied around this static load;
  two electromagnets arranged one on each side of said flexible blade, which makes it possible to increase the amplitude of the flapping; or
  a single electromagnet which is secured to the flexible blade and exerts an electromagnetic force on said structure, which makes it possible to save weight.

Furthermore, in another embodiment, said actuating means comprises an iron bar arranged on said flapping mass and a coil surrounding said iron bar and dissipating energy into an electric resistor via a unit controlling the current or the voltage or alternatively the resistance of the dissipating resistor.

The vibration-reduction device obtained is therefore very lightweight and consumes little energy.

BRIEF DESCRIPTION OF THE DRAWING

The figures of the appended drawing will make it easy to understand how the invention may be embodied. In these figures, identical references denote similar elements.

DESCRIPTION OF THE PREFERRED EMBODIMENTS

Figure 1:
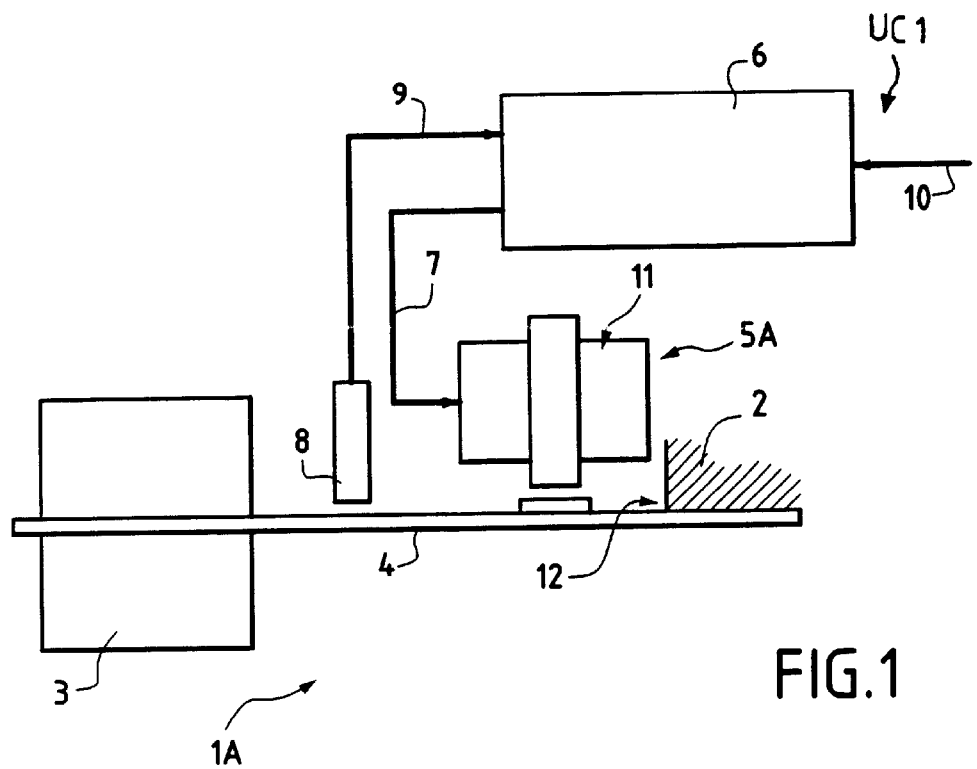
FIGS. 1,2,3 and 4 diagrammatically depict different and preferred embodiments of a device according to the invention.

The device according to the invention and depicted in four different embodiments 1A, 1B, 1C, 1D in FIGS. 1 to 4, respectively, is intended to reduce the vibrations generated on the structure 2 of a rotary-wing aircraft, particularly a helicopter, not depicted.

According to the invention, said device 1A to 1D comprises:
  a flapping mass 3 connected, via a flexible blade 4, to said structure 2;
  an actuating means 5A, 5B, 5C or 5D specified hereinbelow, which is controllable and capable, by means of an electromagnetic force, of moving said flapping mass 3, that is to say of making it flap; and
  a control unit UC1, UC2 intended to control said actuating means 5A to 5D, as illustrated by a link 7, so that it moves said flapping mass at a frequency and amplitude that allow said vibrations to be reduced and minimized.

The flexible blade 4 and the flapping mass 3 are set to a mean frequency and the excitation of this resonating assembly is therefore achieved electromagnetically by said actuating means 5A to 5D, which means that the vibration-reduction action can be adjusted precisely.

Of course, in the context of the present invention, said excitation may just as well be performed mechanically, hydraulically or by any other means.

Thus, by virtue of the invention, and particularly by virtue of the low number of parts, said device 1A to 1D is simple, compact and inexpensive.

Furthermore, the operating cost of this device 1A to 1D is practically nil, because it contains no moving parts and the flexible blade 4 is designed for an infinite life.

According to the invention, said device 1A, 1B, 1C additionally comprises a position sensor 8, for example an optical sensor, inductive sensor or Hall-effect sensor, capable of measuring values which represent the position of said flapping mass 3, and, in particular, of measuring the distance between said sensor 8, which is stationary, and said flexible blade 4.

The values thus measured are transmitted to the control unit UC1 by a link 9 and are used by this unit to determine, refine, and/or control the commands for controlling the actuating means 5A to 5C, this making it possible to improve the performance of said device 1A to 1C.

Furthermore, according to the invention:

in the embodiments 1A to 1C, the control unit UC1 comprises means 6 which provide force-control and perform this feedback control particularly using measurements from the position sensor 8, and a computer, not depicted, which, in the usual way, formulates the commands and transmits them via a link 10; and in the embodiment 1D, said control unit UC1 is a computer of the usual type.

As can be seen in FIG. 1, the actuating means 5A comprises an electromagnet 11 which is stationary and which acts on the flexible blade 4 which, for its part, is formed in such a way as to be sensitive to electromagnetic forces.

It is known that an electromagnet is able to generate substantial forces, but has the drawback of being able to do so only over short distances.

Thus, to increase the effectiveness of the electromagnet 11, it is arranged in such a way as to act on the flexible blade 4 near to its region 12 of attachment to the structure 2, where the movements of the blade 4 are small and its stiffness is high.

It will be noted that, in the embodiments comprising a coil, the position sensor 8 may be a means capable of measuring the voltage and current at the terminals of the coil.

Figure 2:
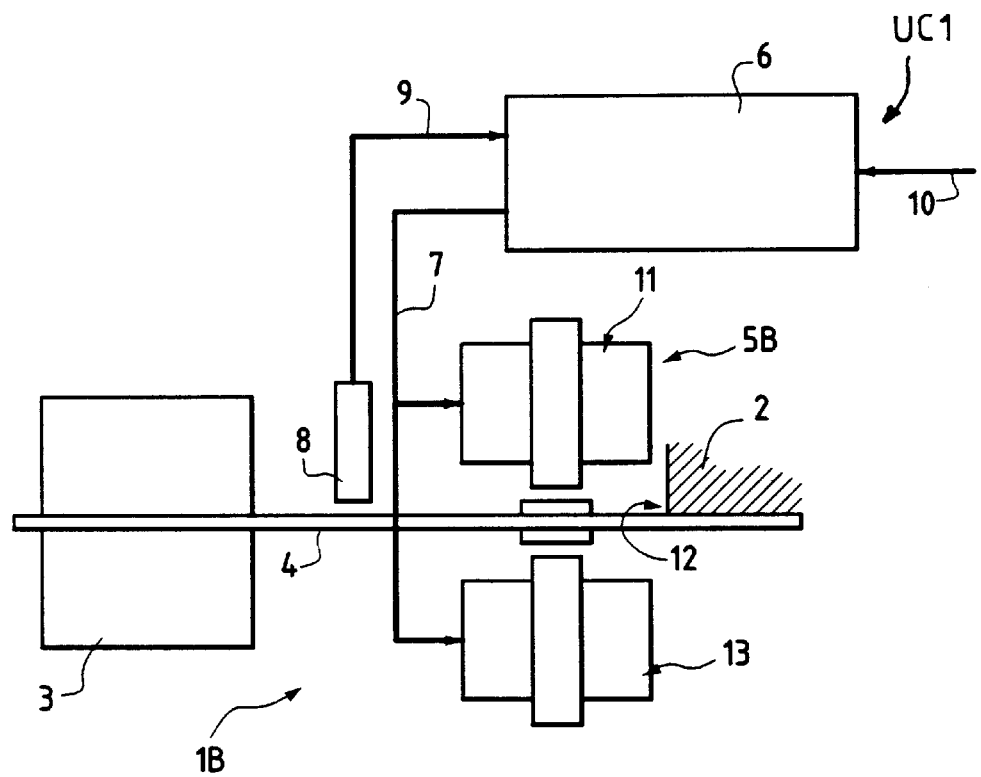

In the embodiment of FIG. 2, the actuating means 5B comprises, in addition to the electromagnet 11, a second electromagnet 13, said electromagnets 11 and 13 being arranged one on each side of the flexible blade 4 near to the attachment region 12.

Through a combined action of the these two electromagnets 11 and 13, the blade 4 can be made to flap with a large amplitude.

Figure 3:
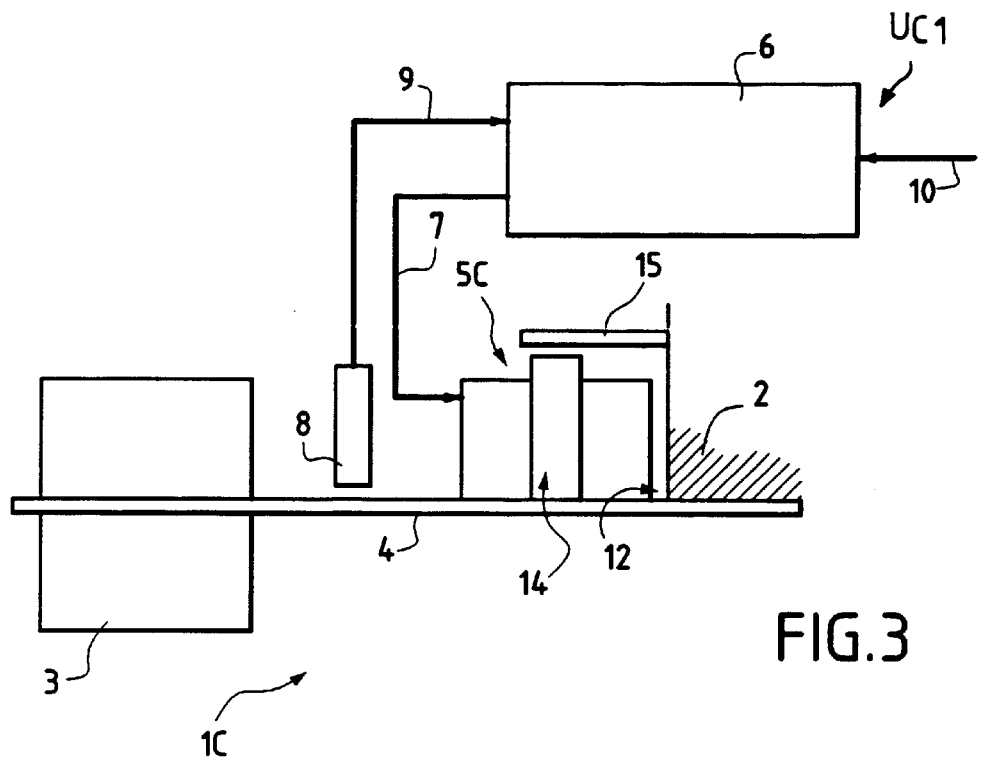

Furthermore, to save weight, an electromagnet 14 may be mounted directly on the blade 4, as depicted in FIG. 3.

This electromagnet 14 therefore acts on a metallic element 15 fixed to the structure 2.

The added weight thus obtained makes it possible for the mass 3 to be reduced accordingly.

Figure 4:
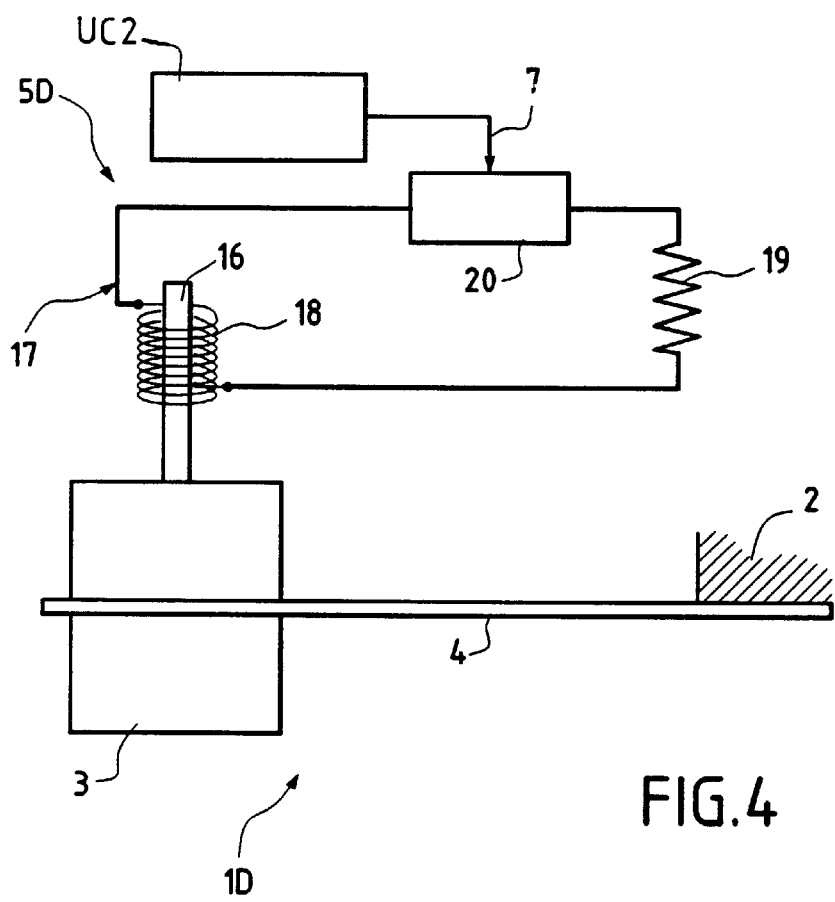

Furthermore, in the embodiment of FIG. 4, the actuating means 5D comprises an iron bar 16 which is fixed to the mass 3 and which is subjected to the action of an electric circuit 17.

This electric circuit 17 comprises a coil 18 surrounding the bar 16 and dissipating energy into a resistor 19, and a switching device 20 controlled by the control unit UC2 and producing a controlled variation in current passing through the coil 18.

This last device 1D is extremely lightweight and consumes little energy.

Furthermore, although the vibration reduction obtained by this device 1D is not as high as the reduction achieved by the devices 1A to 1C, it suffices for numerous types of vibrations.

Furthermore, the device 1A to 1D according to the invention may of course be applied to different structures.

Nonetheless, as a preference, it is used to reduce the aforementioned vibrations known as "tail shake". To this end, in the case of a helicopter, said device 1A to 1D is preferably mounted in the structure 2 of the tail boom near the tail fin and horizontal stabilizer of said helicopter.

What is claimed is:

1. An apparatus for reducing vibration generated on a structure (2) of a rotary-wing aircraft, said apparatus comprising:

at least one mobile mass (3) adapted to be connected to said structure (2) and a control unit (UC1, UC2) intended to control at least one actuating means (5A, 5B, 5C, 5D) associated with said mobile mass (3) that exerts an electromagnetic force so as to reduce said vibration, wherein said mobile mass comprises a flapping mass (3) connected to a flexible blade (4) adapted to be connected to said structure (2), said actuating means (5A, 5B, 5C, 5D) exerting an electromagnetic force in order to cause said flapping mass (3) to flap, and said actuating means (5A, 5B, 5C, 5D) being controlled by said control unit (UC1, UC2) in such a way that said control unit (UC1, UC2) causes said flapping mass (3) to flap at a frequency and at an amplitude that allow said vibration to be reduced.

2. The apparatus as claimed in claim 1, which additionally comprises a position sensor (8) that measures values which represent the position of said flapping mass (3), said values being transmitted to said control unit (UC1) and used by said control unit (UC1) to determine commands for controlling said actuating means (5A, 5B, 5C).

3. The apparatus as claimed in claim 1, wherein said actuating means (5A, 5B, 5C) comprises at least one electromagnet (11, 13, 14) having an action which has an effect on said flexible blade (4).

4. The device as claimed in claim 3, wherein said at least one electromagnet (11, 13) is secured to said structure (2) and acts on the flexible blade (4) fixed to the structure (2) near an attachment region (12).

5. The device as claimed in claim 1, wherein said actuating means comprises two electromagnets (11, 13) each of which is arranged on a respective side of said flexible blade (4).

6. The device as claimed in claim 1, wherein said actuating means comprises at least one electromagnet (14) secured to said flexible blade (4) that exerts an electromagnetic force on said structure (2).

7. The device as claimed in claim 1, wherein said actuating means comprises an iron bar (16) arranged on said flapping mass (3) and a coil (18) surrounding said iron bar (16) and dissipating energy into an electric resistor (19).

8. An apparatus for reducing vibration generated on a structure of a rotary-wing aircraft, said apparatus comprising:

a mobile mass adapted to be connected to said structure;

a flexible blade connected to said mobile mass, said flexible blade having a longitudinal axis and being adapted to be connected to said structure;

an actuator operatively coupled to cause movement of said movable mass in a direction perpendicular to said longitudinal axis of said flexible blade, said actuator exerting an electromagnetic force so as to reduce said vibration; and a control unit operatively coupled to control said actuator that said control unit causes said mass to move at a frequency and at an amplitude that allow said vibration to be reduced.

9. The apparatus as claimed in claim 8, which additionally comprises a position sensor that measures values which represent the position of said mass, said values being transmitted to said control unit and used by said control unit to determine commands for controlling said actuator.

10. The apparatus as claimed in claim 8, wherein said actuator comprises at least one electromagnet that is operatively coupled to move said flexible blade.

11. The device as claimed in claim 10, wherein said at least one electromagnet is secured to said structure and acts on said flexible blade fixed to said structure near to an attachment region.

12. The device as claimed in claim 8, wherein said actuator comprises two electromagnets, each of which is arranged on a respective side of said flexible blade.

13. The device as claimed in claim 8, wherein said actuator comprises at least one electromagnet secured to said flexible blade that exerts an electromagnetic force on said structure.

14. The device as claimed in claim 8, wherein said actuator comprises an iron bar arranged on said mass and a coil surrounding said iron bar that dissipates energy into an electric resistor.

* * * * *